June 16, 1931.  J. A. GRAY  1,810,169
MOVING PICTURE SCREEN
Filed Feb. 12, 1930   2 Sheets-Sheet 1

INVENTOR
James A. Gray
BY
ATTORNEY

June 16, 1931.  J. A. GRAY  1,810,169
MOVING PICTURE SCREEN
Filed Feb. 12, 1930   2 Sheets-Sheet 2
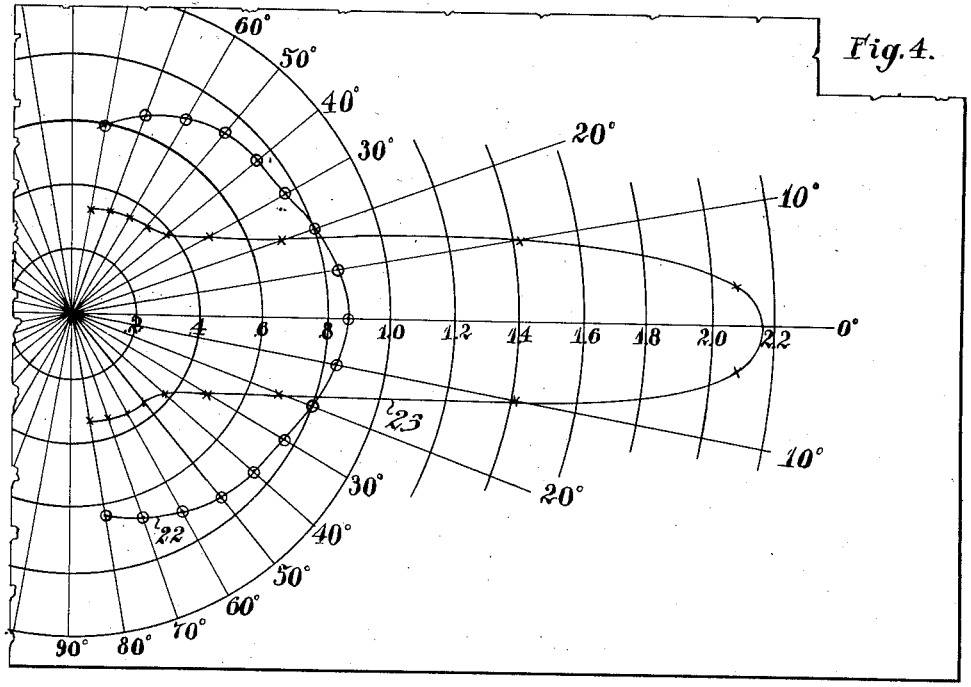
Fig. 4.
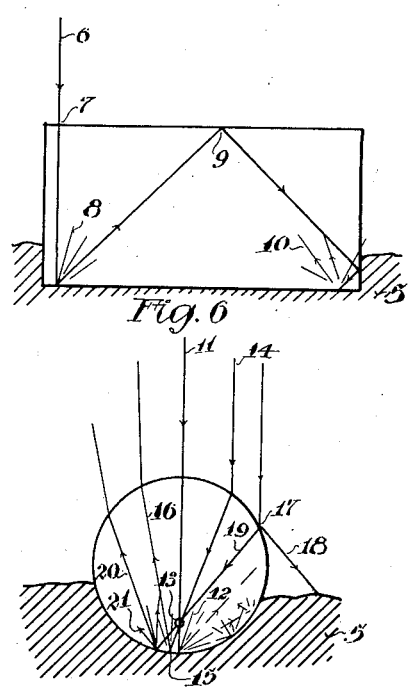
Fig. 6.
Fig. 7.
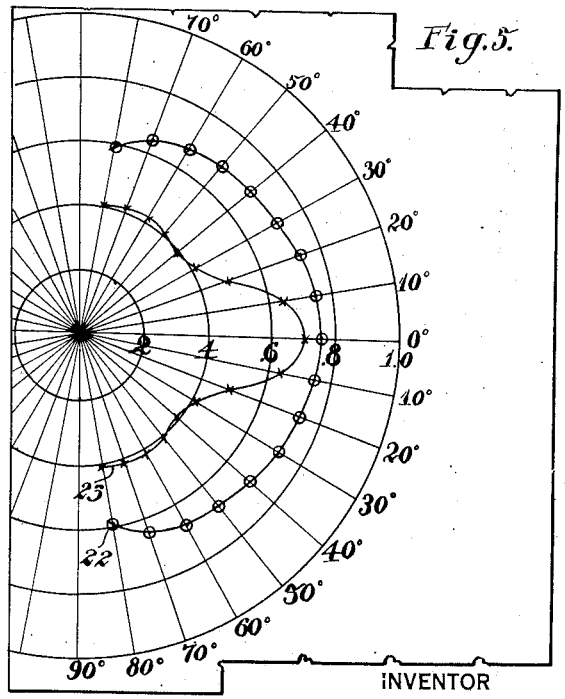
Fig. 5.
INVENTOR
James A. Gray
BY
ATTORNEY Patented June 16, 1931

1,810,169

UNITED STATES PATENT OFFICE

JAMES A. GRAY, OF ST. PAUL, MINNESOTA

MOVING PICTURE SCREEN

Application filed February 12, 1930. Serial No. 427,760.

The present invention relates to a moving picture projection screen.

In the projection of motion pictures onto a screen, a considerable amount of difficulty is encountered in obtaining a material for the projection screen which will diffuse the light projected onto it so as not to be glaring when one is sitting in a directly reflective angle between the projector and the plane of the screen and which will prevent fading and undue distortion when one is sitting at a comparatively large angle from the directly reflective angle between the projected rays and the plane of the screen.

The use of sound reproduction in connection with moving pictures has placed a further essential requirement on projection screens in that they must provide a ready passage for sound waves therethrough, since the sound reproduction apparatus is ordinarily positioned directly behind the screen with the horn through which the sound waves are emitted positioned to direct the sound waves through the projection screen. Various types of screen material and surfaces therefor have been used for reproduction screens, such as coatings of bronze powders, glass beads, both etched and plain, and various types of pigments. Each of these types of surfaces has desirable characteristics, but none of these types has proved entirely satisfactory.

An object of the present invention is to make an improved projection screen.

In order to attain this object, there is provided, in accordance with one feature of the invention, a screen made of open-weave cloth with a plurality of small glass cylinders adhesively secured to the outer surface thereof.

These and other features of the invention will be more fully brought out in the following description and the accompanying drawings, wherein:

Figure 4 is a graph showing comparative readings between a screen embodying the present invention and a second screen of a type commonly used.

Figure 5 is a similar graph showing comparative readings where the incident rays are inclined at a different angle.

Figure 6 is a view in side elevation of one of the glass particles showing lengthwise diffusion of light rays; and Figure 7 is a view in end elevation thereof showing lateral diffusion of light rays.

Figure 1:
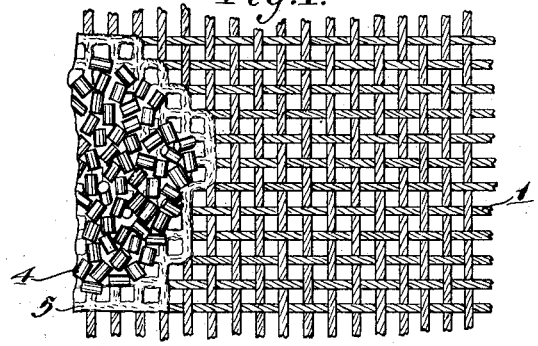
Figure 1 is a view in top elevation of a portion of a screen with the glass clyinders covering a portion thereof.

Referring to the drawings in detail, the body of the screen, or backing, 1, is preferably made of silk bolting cloth, since this cloth is of open weave, uniform porosity, great strength, and does not easily stretch or sag. The bolting cloth used is preferably woven between sixty and one hundred threads to the inch. The bolting cloth, which is manufactured in strips, is sewed together to form a rectangle having the dimensions of the desired screen. A border 2 of heavy, strong cloth is secured around the edges of the rectangle, as by sewing or gluing. When sewed on, it has been found that the sewing weakens the screen at the line of attachment between the bolting cloth and the border, and it is, therefore, preferred to adhesively secure the border to the body of the screen as by means of a pyroxilin adhesive. A strip of paper 3 is preferably secured over the border so as to prevent coating the border when applying preparatory coatings to the bolting cloth. The bolting cloth body of the screen is then coated with an atomized spray of pigmented compound 5, the compound being applied lightly so as not to fill the openings in the cloth, but merely to coat the threads of the cloth. It is desirable to pre-coat the fabric with atomized gum arabic or similar substance to form a protective, elastic coating over the threads of the fabric, as this adds greatly to the life of the screen and forms a suitable base for the superposed coats. Also, a coat of sealing material may be applied over the first coat to prevent bleeding through of any active materials in the fabric threads. While the surface of the last coat is still tacky, a plurality of small cylindrical particles 4 of glass are distributed over this surface. These particles are obtained by cutting small crown glass rods about eight thousandths of an inch in diameter into pieces about sixteen thousands of an inch long. In practice it has been found that in thus cutting up the small rods that small chips of glass are fractured off and are present in the resultant product, but these infinitely small particles usually have at least one cylindrical face and do not noticeably detract from the desired result, so that at present no attempt has been made to remove them. While the above size has been found to be suitable the exact size is not critical and a considerable amount of variation in the size of the particles is permissible.

Figure 2:
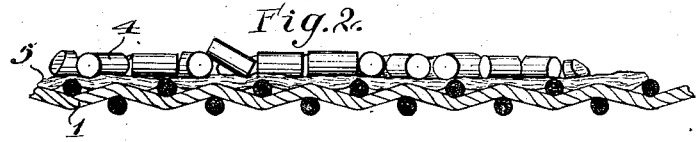
Figure 2 is a transverse section through the screen showing a plurality of the cylinders distributed thereon.
Figure 3:
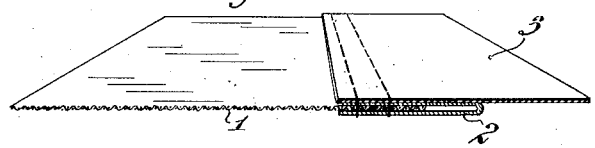
Figure 3 is a view of a portion of the screen showing one method of binding the edges thereof.

The small cylindrical glass particles being longer than they are wide will have a natural tendency to lie with their longitudinal axes substantially parallel to the plane of the backing cloth and examination under the miscroscope has proven that the large majority of them actually do assume this position. Due to their small size and light weight, however, a portion of them will be canted at various angles, as illustrated in Figures 1 and 2. This, again, while not particularly desired, does not noticeably detract from the effectiveness of the screen, since each one that is in this offset position is surrounded by dozens of others in the required plane, and, since further, the particles thus positioned do not entirely lose their effectiveness.

The theoretical advantages of this type of surfacing, and they have been demonstrated to be sound by experiment as will be hereinafter described, are as follows: Each of the small glass particles 4 acts as a cylindrical lens, while the pigmented material in which they are partially embedded acts as a diffusive backing therefor. Considering the action of a single particle upon a pencil of light, this is illustrated in Figures 6 and 7. In Figure 6 the longitudinal diffusion is brought out, while Figure 7 illustrates the lateral diffusive effect.

Referring to Figure 6 a plane of light 6 having a thickness approaching zero and represented by a single line and of the width of the rod enters the rod as at 7. A portion of the rays enter the rod and pass through to the pigmented background 5. Owing to the pigmentation, which prevents a direct reflection, as would be the case with a perfect reflector such as silver, some of the rays are diffused as indicated by the small lines 8, while, of course, others are reflected back in the plane of incidence. The diffused rays, which, on their return strike the outer surface of the particle at an angle greater than forty-three degrees from the vertical for crown glass, do not pass, but are reflected back into the rod as at 9 and again pass through to the pigmented backing where a further diffusion, as at 10, is accomplished.

The lateral diffusion is illustrated in Figure 7. Assuming again an incident plane of light 11 at right angles to the axis of the cylindrical glass particle and following the course of a few of the rays therethrough: The ray 11 entering on the diameter of the particle will pass through to the pigmented backing, where a portion thereof will be reflected back along the path of incidence, while a portion 12 thereof will be diffused by the pigmented backing. Assuming that the focal point for the incident rays is at 13, a second incident ray 14 striking the surface of the particle would be refracted to pass through the focal point and would strike the pigmented backing at 15. A portion of this ray would be reflected along the path 16 and would again be refracted as it passed out of the particle. Some of the rays which strike the walls of the particle at a small acute angle will be reflected back through it to the pigmented background where they are still further diffused. As the rays approach the lateral extremity of the particle, their angle of incidence will be at an ever lessening angle and their angle of refraction will, therefore, increase. As the angle of incidence decreases the proportion of rays directly reflected will increase in accordance with a well known principle, so that a ray striking at 17 would be partially reflected along the path 18, while the remainder would enter the particle along the path 19 and would be partly diffused at its point of incidence 21 with the pigmented background and partly reflected along the path 20 and would be again refracted as it passes from the particle to the air. Thus, each of the innumerable particles acts as a diffusive lens and as the particles are spread at random on the backing they lie in every conceivable angle with respect to the sides of the screen, but with the large majority in approximately the plane of the screen.

The graphs illustrated in Figures 4 and 5 show a laboratory comparison of a screen embodying the present invention with another projection screen of a well known type, the line 22 in each case representing the readings for the screen embodying the present invention, and the line 23 representing the readings for the other screen.

Figure 4 shows the incident ray perpendicular to the screen with the observer moving in a horizontal plane passing through the incident ray. The readings are in apparent foot candles, as is customary in a test of this character. It will be noted that the readings for the screen made in accordance with the present invention vary from six-tenths a. ft. c. at eighty degrees from the incident rays to slightly over eight-tenths a. ft. c. when parallel thereto, or a variation of only slightly over two-tenths a. ft. c., which variation could not be detected by the ordinary observer without the use of instruments; while the other screen varied between less than four-tenths a. ft. c. at eighty degrees from the incident ray to almost two and two-tenths a. ft. c. at zero degrees from the incident rays.

The graph illustrated in Figure 5 illustrates a reading taken with the angle of the incident rays twenty degrees from the vertical with the observer in the same plane as in test for Figure 4. Here it will be noted that the reading for the screen embodying the present invention varies between six-tenths a. ft. c. at eighty degrees from the plane of the incident rays to almost eight-tenths a. ft. c. in the plane of the incident rays, while the reading for the other screen varies between four-tenths a. ft. c. at eighty degrees to about seven-tenths a. ft. c. in the plane of the incident rays. Thus, from a practicable standpoint, with a screen embodying the present invention, the observer will obtain practically uniform and equal luminosity whether he sits directly in the path of reflection of the projected rays or far over to one side near the front of the theater. This uniform diffusion entirely eliminates the "flate" and "fade out" effects inherent in a great many of the present types of screen.

Another feature of the new screen which so far has not been satisfactorily explained from a theoretical standpoint, but, nevertheless, has been observed to be true, is that pictures projected onto the present screen appear to have a brilliance of color and an illusion of depth not found in any of the other screens tested.

I claim:

1. A projection screen having a porous backing member, a coating of pigmented compound over the threads of said backing member, and a layer of small cylindrical glass particles positioned over said compound.

2. A projection screen having a backing member of uniformly woven porous material, a coating of adhesive material over the strands of said fabric, but not extending across the interstrand openings, and a layer of small cylindrical transparent particles positioned on said compound to have the majority thereof with their major axes substantially in the plane of said backing material.

3. A projection screen having a backing of evenly woven mesh material, a pigmented coating over the strands of said mesh material, but not extending over the mesh openings, and a layer of small cylindrical glass particles partially embedded in said pigmented coating.

4. A projection screen having a backing with a plurality of small, closely positioned, uniform apertures therethrough, a coating of pigmented adhesive over said backing, but not over the apertures therein, and a layer of small cylindrical transparent particles spread over said screen to be partially embedded in said adhesive and to have the major portion of said particles with their axes substantially parallel with the plane of the backing.

5. A projection screen having a backing of strong, pliant mesh material having fine mesh openings therein, a pigmented coating over the strands of said mesh material, but not entirely over the mesh openings therein, and a plurality of finely divided small glass rods spread over the surface thereof to be embedded less than half their diameter in said coating.

6. A projection screen having a backing member of silk bolting cloth, a coating of flexible impervious material over the threads of said bolting cloth, but not across the mesh openings therein, a coating of pigmented material over said flexible coating, said pigmented coating also not extending across the mesh openings in said cloth, and a layer of finely divided, small glass rods spread upon said pigmented coating to be partially embedded therein and adhesively secured in position thereby.

In testimony whereof I affix my signature.

JAMES A. GRAY.